United States Patent [19]

Cann et al.

[11] Patent Number: 5,102,841
[45] Date of Patent: Apr. 7, 1992

[54] PROCESS FOR THE PRODUCTION OF POLYETHYLENE

[75] Inventors: Kevin J. Cann, Rocky Hill; Robert C. Brady, III, Morristown; Yimsan Gau, Somerset, all of N.J.

[73] Assignee: Union Carbide Chemicals & Plastics Technology Corporation, Danbury, Conn.

[21] Appl. No.: 625,936

[22] Filed: Dec. 11, 1990

[51] Int. Cl.$^5$ ............................................. C08F 4/654
[52] U.S. Cl. .................................... 502/112; 502/109; 502/118; 502/119; 526/125
[58] Field of Search ............... 502/109, 118, 112, 119

[56] References Cited

U.S. PATENT DOCUMENTS

| | | | |
|---|---|---|---|
| 3,594,330 | 7/1971 | Delbouille et al. | 502/104 |
| 4,303,771 | 12/1981 | Wagner et al. | 502/112 X |
| 4,359,402 | 11/1982 | Haas et al. | 502/109 X |
| 4,508,842 | 4/1985 | Beran et al. | 502/112 |
| 4,560,671 | 12/1985 | Gross et al. | 502/105 |
| 4,585,840 | 4/1986 | Gross et al. | 526/159 |
| 4,607,019 | 8/1986 | Best | 502/119 |

Primary Examiner—Patrick P. Garvin
Attorney, Agent, or Firm—Saul R. Bresch

[57] ABSTRACT

A process for the production of polyethylene comprising contacting ethylene or a mixture comprising ethylene and one or more alpha-olefins and, optionally, one or more diolefins, under polymerization conditions, with a catalyst system comprising:
(a) a particulate catalyst precursor based on titanium or vanadium;
(b) polypropylene support particles to which the catalyst precursor particles are bonded; and
(c) a hydrocarbyl aluminum cocatalyst.

4 Claims, No Drawings ns5,102,841

PROCESS FOR THE PRODUCTION OF POLYETHYLENE

TECHNICAL FIELD

This invention relates to a process for the polymerization of ethylene utilizing a variation of a supported catalyst.

BACKGROUND INFORMATION

Silica supported titanium based ethylene polymerization catalysts have been successfully used for many years; however, their use does result in the presence of impurities in the final product. These impurities, in turn, cause the polyethylene to have a poor film appearance rating. Thus, while silica supported catalysts provide good particle morphology, a sacrifice is made in the quality of the resin.

DISCLOSURE OF THE INVENTION

An object of this invention, then, is to provide a process for the production of polyethylene utilizing a catalyst having a support which furnishes a particle morphology equivalent to silica and other inorganic oxide supports, but essentially avoids the presence of an objectionable residue in the resin.

Other objects and advantages will become apparent hereinafter.

According to the present invention, a process for the production of polyethylene has been discovered comprising contacting ethylene or a mixture comprising ethylene and one or more alpha-olefins and, optionally, one or more diolefins, under polymerization conditions with a catalyst system comprising (a) a particulate catalyst precursor containing titanium and/or vanadium;
(b) polypropylene support particles to which the catalyst precursor particles are bonded; and
(c) a hydrocarbyl aluminum cocatalyst.

DESCRIPTION OF THE PREFERRED EMBODIMENT(S)

A typical titanium based catalyst precursor and a method for its preparation are described in U.S. Pat. No. 4,303,771. This particular precursor has the formula $Mg_aTi(OR)_bX_c(ED)_d$ wherein R is an aliphatic or aromatic hydrocarbon radical having 1 to 14 carbon atoms or COR' wherein R' is an aliphatic or aromatic hydrocarbon radical having 1 to 14 carbon atoms; each OR group is the same or different; X is Cl, Br, or I, or mixtures thereof; ED is an electron donor; a is 0.5 to 56; b is 0, 1, or 2; c is 2 to 116; and d is greater than 1.5 a+2;

A titanium compound, which can be used in the above preparation, has the formula $Ti(OR)_aX_b$ wherein R and X are as defined for component (a) above; a is 0, 1, or 2; b is 1 to 4; and a+b is 3 or 4. Suitable compounds are $TiCl_3$, $TiCl_4$, $Ti(OC_6H_5)Cl_3$, $Ti(OCOCH_3)Cl_3$ and $Ti(OCOC_6H_5)Cl_3$.

A magnesium compound useful in preparing the precursor has the formula $MgX_2$ wherein X is as defined for component (a) above. Suitable examples are $MgCl_2$, $MgBr_2$, and $MgI_2$. Anhydrous $MgCl_2$ is a preferred compound. About 0.5 to 56, and preferably about 1 to 10, moles of the magnesium compound are used per mole of titanium compound.

The electron donor suitable for use in the preparation of the catalyst precursor is an organic compound, which is liquid at temperatures in the range of about 0° C. to about 200° C. It is also known as a Lewis base. The compounds used in the preparation of the catalyst precursor, i.e., the titanium and magnesium compounds, are soluble in the electron donor.

The electron donor can be an alkyl ester of an aliphatic or aromatic carboxylic acid, an aliphatic ketone, an aliphatic amine, an aliphatic alcohol, an alkyl or a cycloalkyl ether, or a mixture thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, ethyl propionate, hexyl ether, acetone, and methyl isobutyl ketone.

The hydrocarbyl aluminum cocatalyst can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methyloxyphenyl, benzyl, tolyl, xylyl, naphthyl, naphthal, methylnaphthyl, cyclohexyl, cycloheptyl, and cyclooctyl.

Examples of hydrocarbyl aluminum compounds are as follows: triisobutylaluminum, trihexylaluminum, diisobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred hydrocarbyl aluminums are triethylaluminum, triisobutylaluminum, trihexylaluminum, diisobutylaluminum hydride, and dihexylaluminum hydride.

A modifier can be included in the catalyst precursor, if desired. A suitable modifier can have the formula $BX_3$ or $AlR_{(3-a)}X_a$ wherein each R is an alkyl radical having 1 to 14 carbon atoms; X is chlorine, bromine, or iodine; each R and X are the same or different; and a is 0, 1, or 2. Preferred modifiers include alkylaluminum mono- and di-chlorides wherein each alkyl radical has 1 to 6 carbon atoms, and boron trichloride. A particularly preferred modifier is diethyl aluminum chloride. About 0.1 to about 10 moles, and preferably about 0.2 to about 2.5 moles, of modifier are used per mole of electron donor. When the modifier is used it is considered to be part of the precursor complex, i.e., the catalyst precursor.

A typical vanadium based catalyst precursor and a method for its preparation are described in U.S. Pat. No. 4,508,842. The precursor comprises the reaction product of a vanadium compound and an electron donor, which is a liquid, organic Lewis base in which the vanadium compound is soluble.

The vanadium compound can be any one of the well known group of vanadium compounds used to form those complexes, which find use as catalyst precursors in polymerization processes. Examples are vanadium trihalides, vanadium tetrahalides, and vanadium oxyhalides. The halides are generally chlorides, bromides, or iodides, or mixtures thereof. Of these compounds, $VCl_3$, $VCl_4$, and $VOCl_3$ can be mentioned. The vanadium acetylacetonates such as vanadyl triacetylacetonate are also useful.

The electron donor for this typical vanadium based catalyst precursor is the same as that recited above for the typical titanium based catalyst precursor. The cocatalyst and the optional modifier are the same as well.

While an excess of electron donor is generally used initially to provide the reaction product of vanadium compound and electron donor, the reaction product finally contains about 1 to about 20 moles of electron donor per mole of vanadium compound and preferably about 1 to about 10 moles of electron donor per mole of vanadium compound. About 3 moles of electron donor per mole of vanadium compound has been found to be most preferable.

A halocarbon promoter is preferably included in the vanadium based catalyst systems. Such a promoter can have the following formula:

$$R_aCX_{(4-a)}$$

wherein
R = hydrogen or an unsubstituted or halogen substituted alkyl radical having 1 to 6 carbon atoms;
X = a halogen; and
a = 0, 1, or 2.

The halogen can be chlorine, bromine, iodine, or fluorine, and each X can be alike or different. Preferred promoters include fluoro-, chloro-, and bromo-substituted methane or ethane having at least 2 halogen atoms attached to a carbon atom, e.g., chloroform, $CFCl_3$, $CH_3CCl_3$, carbon tetrachloride, and $CF_2ClCCl_3$. The first three mentioned promoters are preferred.

Mixed titanium and vanadium containing precursors are also contemplated.

It has been pointed out that the catalyst precursor is particulate. Particle sizes can be in the range of about 0.001 to about 100 microns and are preferably in the range of about 0.5 to about 5 microns. The polypropylene support is also particulate, the particle sizes being in the range of about 0.1 to about 1000 microns and preferably in the range of about 1 to about 500 microns.

Any conventional polypropylene of suitable particle size can be used as the support. The polypropylene can be a homopolymer or a copolymer of propylene and one or more alpha-olefins and/or dienes. One process for the production of polypropylene is mentioned in U.S. Pat. No. 4,414,132. A typical polypropylene support is a solid, particulate material essentially inert to the materials involved in the polymerization such as the monomers, chain transfer agents, and the components of the catalyst system. It should also not be used in those liquid phase polymerizations in which it will dissolve in the polymerization medium. Where the polypropylene is a copolymer rather than a homopolymer, the polypropylene is generally based on at least about 65 percent by weight propylene and preferably at least about 90 percent by weight propylene based on the total weight of the copolymer.

The amount of support used in the catalyst system is generally that which will provide about 0.01 to about 10 millimoles of titanium or vanadium per gram of support and preferably about 0.05 to about 3 millimoles of titanium per gram of support and about 2 to about 7 millimoles of vanadium per gram of support.

The cocatalyst, modifier, and promoter can be added to the catalyst precursor either before or during the polymerization reaction. The modifier, however, is preferably added to the catalyst precursor prior to the polymerization. The cocatalyst and promoter are preferably added separately neat or as a solution in an inert solvent, such as isopentane, to the polymerization reactor at the same time as the flow of monomers is initiated.

Useful molar ratios for the titanium and vanadium based catalyst systems described above are about as follows:

|   |   | Broad | Preferred |
|---|---|---|---|
| 1. | Mg:Ti | 0.5:1 to 56:1 | 1.5:1 to 20:1 |
| 2. | Mg:X | 0.005:1 to 28:1 | 0.075:1 to 1:1 |
| 3. | Ti:X | 0.01:1 to 0.5:1 | 0.05:1 to 0.2:1 |
| 4. | Mg:ED | 0.005:1 to 28:1 | 0.15:1 to 1.25:1 |
| 5. | Ti:ED | 0.01:1 to 0.5:1 | 0.05:1 to 0.25:1 |
| 6. | modifier:ED | 0:1 to 5:1 | 0.1:1 to 1:1 |
| 7. | ED:V | 1:1 to 20:1 | 1.1 to 10:1 |
| 8. | Promoter: Cocatalyst | 0.1:1 to 10:1 | 0.2:1 to 2:1 |
| 9. | cocatalyst: Ti or V | 5:1 to 500:1 | 10:1 to 40:1 |

The weight ratio of polypropylene support to catalyst precursor can be in the range of about 0.5:1 to about 90:1 and is preferably in the range of about 5:1 to about 50:1.

The ethylene polymerization can be conducted in the gas phase or liquid phase using conventional techniques such as fluidized bed, slurry, or solution processes. A continuous, fluidized bed process is preferred. Using the fluidized bed process, the supported catalyst precursor, the cocatalyst, the ethylene monomer, and any comonomers are continuously fed into the reactor and polyethylene product is continuously removed. The density of the ethylene copolymer produced may be varied over a wide range depending upon the amount of alpha-olefin comonomer added and upon the particular comonomer employed. The greater the mole percent of alpha-olefin comonomer, the lower the density.

Useful comonomers are alpha-olefins having 3 to 12 carbon atoms, and preferably 3 to 8 carbon atoms, exemplified by propylene, 1-butene, 1-hexene, 4-methyl-1-pentene, and 1-octene. Dienes such as butadiene, ethylidene norbornene, 1,4-hexadiene, 1,6-octadiene, and 1,8 decadiene can also be used, usually as the third comonomer.

The fluidized bed polymerization is conducted at a temperature below the sintering temperature of the product. The operating temperature is generally in the range of about 10° C. to about 115° C. Preferred operating temperatures will vary depending upon the density desired. High density polyethylenes of greater than about 0.94 grams per cubic centimeter (g/cc) are produced at operating temperatures of about 85° C. to about 115° C., and preferably about 90° C. to about 100° C. Low density polyethylenes ranging in density from about 0.91 to about 0.94 g/cc are preferably produced at an operating temperature of about 75° C. to about 90° C. Very low density polyethylenes of less than about 0.91 g/cc are preferably produced at an operating temperature of about 10° C. to about 80° C. In the case of very low density polyethylenes, it is necessary to dilute the reaction mixture with a large quantity of a diluent gas in order to prevent the formation of polymer agglomerates and sustain polymerization on a continuous basis.

The fluidized bed reactor is typically operated at pressures of up to about 1,000, and preferably about 50 to about 350, psig.

The use of more than one reactor, connected in series, enhances the intermediate molecular weight distribution.

A chain transfer agent, such as hydrogen, can be used to terminate the polymer chain. Usually the ratio of hydrogen to ethylene will vary between about 0.001 to about 2.0 moles of hydrogen per mole of ethylene.

The polypropylene support can be bonded to the catalyst precursor either with or without a bonding agent.

The bonding without the bonding agent is accomplished in a finisher. A typical finisher is made up of a shell equipped with thermocouple ports and a cooling jacket; rotating mixing arms within the shell driven by an external motor; a shaft about which the arms rotate, the shaft speed being monitored by a tachometer; tachometer and thermocouple readouts shown on a digital display; an inlet port; a feed auger; and a discharge gate. The number of arms and the geometry of the arms can be easily changed. The finisher can operate in either a batch or continuous mode, and must be operated in an inert atmosphere such as nitrogen.

With the discharge gate closed, the catalyst precursor and the polyethylene support, both in particulate form, are fed into the finisher through the feed auger. During the loading operation, the arms turn at low velocity, e.g., a blade tip speed of at least about 50 to about 150 inches per second. Once the mixture is in the shell, the speed is increased to the desired value, while the rate of temperature rise is closely monitored. Generally, the finisher is operated at a blade tip speed of at least about 750 inches per second. When the temperature reads about 5° C. to about 20° C. below the set point, the tip speed is reduced to about 100 to about 500 inches per second to allow the temperature of the mixture to reach the desired value and stabilize at that level. The about 100 to about 500 inches per second range is found by trial and error. The temperature is maintained at the selected value for a time ranging from about 1 to about 60 minutes before the discharge of the material starts to take place with the opening of the discharge gate.

In the finisher, the rotating mixing arms impart a centrifugal motion to the mixture of catalyst precursor and support to form an annular ring and mechanically work the material to an elevated temperature. During this process, the mixture is held close to its fluxing point enabling the fine catalyst precursor to bond to the surface of the softened support particles. In addition to surface bonding caused by the high temperature, fine catalyst precursor particles can build up and collect in available surface crevices due to the strong mechanical agitation. Furthermore, the combined effect of the intensive impact and shear forces at near fluxing point fragments any agglomerated particles into smaller ones and smooths the sharp edges of individual particles. The concentration of finer particles in the final product can increase depending on the degree of agglomeration of the initial particles. The quality of the bonding is determined by scanning electron micrograph and sieve analysis.

While it is preferred that bonding be accomplished without a bonding agent, suitable bonding agents such as paraffin can be used.

The advantages of the invention are a low ash catalyst system; a polypropylene support, which is a good nucleating agent for polyethylene; a particle morphology (average particle size) of the polyethylene produced using the polypropylene support at least as good as that of polyethylene produced using a silica support; a reduction in the hexane extractables; and the achievement of high bulk densities.

The patents mentioned in this specification are incorporated by reference herein.

The invention is illustrated by the following examples.

EXAMPLES 1 TO 6

The titanium based catalyst precursor used in the examples is prepared according to the procedure described in U.S. Pat. No. 4,303,771. In a 12 liter flask equipped with a mechanical stirrer is placed 41.8 grams (0.439 mole) of anhydrous $MgCl_2$ and 2.5 liters of tetrahydrofuran. To this mixture, 27.7 grams (0.184 mole) $TiCl_4$ is added over 30 minutes while stirring. During this period, the mixture is heated to 60° C. to completely dissolve the material. The mixture is dried with a nitrogen purge at 60° C. for 3 to 5 hours to provide a free-flowing powder having a particle size of about 3 microns. The mixture is stirred at ambient temperature for 30 minutes and then dried under a purge of dry nitrogen at 65° C. until the solvent is removed. The resulting precursor is a free-flowing powder containing 0.23 millimole Ti per gram; a molar ratio of Mg:Ti of 3:1; a molar ratio of Ti:Cl of 0.1:1; a molar ratio of Al:Ti of 3.2:1; and a molar ratio of tetrahydrofuran:Al of 5:1.

The precursor is stored and handled under nitrogen.

Using the finisher and procedure described above, the precursor is bonded to either granular polypropylene (examples 1 to 4) having a particle size of about 75 to 100 microns or granular polyethylene (examples 5 and 6) having a particle size of about 90 to 110 microns. The polypropylene is a homopolymer of propylene and the polyethylene is a high pressure low density polyethylene. Sieve analysis indicates good adhesion between the precursor and the support in all of the examples.

The polymerization of ethylene is conducted in a one liter autoclave equipped with a mechanical overhead stirrer and an external temperature regulating jacket. The autoclave is capable of providing the continuous addition of ethylene at a fixed preset pressure. The reactor is fitted with thermocouples to allow monitoring of the temperature of the external jacket and the internal temperature of the reactor during the polymerization. The ethylene feed line to the reactor is fitted with an electronic gas flow meter to allow the continuous monitoring of the ethylene flow to the reactor. All manipulation of the polymerization reaction components are conducted using airless techniques to rigorously exclude atmospheric oxygen and water.

The reactions are conducted in a slurry of dry, deoxygenated hexane. The autoclave is charged with 500 milliliters of hexane and 20 milliliters of 1-hexane.

At a temperature of 40° C., a solution of 25 weight percent triisobutylaluminum in hexane (based on the weight of the hexane) is added by syringe to the reactor in a molar ratio of Al:Ti of 40:1. The aluminum alkyl acts as a cocatalyst and, by adding the aluminum alkyl to the reactor first, it scavenges trace impurities. The supported catalyst precursor is then added to the reactor.

The reactor is sealed immediately following the addition of the last component and is then heated to 60° C. The reactor is then flushed with hydrogen and then pressurized with hydrogen to 20 psig (pounds per square inch gauge). Hydrogen is added to regulate the polymer molecular weight. Heating is continued to 75° C. at which point the reactor is pressurized with ethylene to a total pressure of 160 psig. The ethylene flow into the reactor is monitored with a mass flowmeter and the internal and jacket temperatures of the reactor are continuously monitored during the polymerization reaction. The jacket temperature is regulated to maintain the internal temperature of the reactor at 85° C.

The polymerization is conducted for 30 minutes. At that time the ethylene flow to the reactor is stopped, the reactor is vented to ambient pressure, and the jacket is flushed with cold water to bring the internal temperature to ambient as quickly as possible. The polymer/hexane slurry is removed from the reactor, stabilizers are added, and the solvent is allowed to evaporate overnight. The polymer is dried in a vacuum oven at 80° C. and then weighed.

Variable conditions and results are set forth in the Table.

We claim:

1. A catalyst system comprising:
   (a) a particulate catalyst precursor having the formula $Mg_aTi(OR)_bX_c(ED)_d$ wherein R is an aliphatic or aromatic hydrocarbon radical having 1 to 14 carbon atoms or COR' wherein R' is an aliphatic or aromatic hydrocarbon radical having 1 to 14 carbon atoms; each OR group is the same or different; X is Cl, Br, or I, or mixtures thereof; ED is an electron donor; a is 0.5 to 56; b is 0, 1, or 2; c is 2 to 116; and d is greater than 1.5a+2, the particle size of the catalyst precursor being in the range of about 0.5 to about 5 microns;
   (b) polypropylene support particles to which the catalyst precursor particles are bonded, the particle size of the polypropylene being in the range of about 1 to about 500 microns;
   wherein the ratio by weight of polypropylene support to catalyst precursor is in the range of about 5:1 to about 50:1; and
   (c) a hydrocarbyl aluminum cocatalyst.

2. The catalyst system defined in claim 1 wherein the polypropylene support is either a homopolymer of propylene or a copolymer of propylene based on at least about 65 percent by weight propylene.

3. The catalyst system defined in claim 1 wherein the catalyst precursor additionally includes a modifier having the formula $BX_3$ or $AlR_{(3-a)}X_a$ wherein each R is an alkyl radical having 1 to 14 carbon atoms; X is chlorine, bromine or iodine; each R and X are the same or different; and a is 0, 1, or 2.

4. The catalyst system defined in claim 1 wherein the polypropylene support particles are bonded to the catalyst precursor particles with a bonding agent.

* * * * *

TABLE

| Example | Support (% by wt) | Finisher (rpm) | Temperature (°C.) | Precursor/support (sieve cut on mesh) | Catalyst activity | Average Particle Size (microns) | Settled bulk density (g/cc) |
|---|---|---|---|---|---|---|---|
| 1 | PP 80% | 1900 | 110 | — | 2891 | 836 | 0.31 |
| 2 | PP 80% | 1900 | 110 | 60 to 100 | 3355 | 1450 | 0.30 |
| 3 | PP 80% | 1900 | 110 | 40 to 60 | 2748 | 1870 | 0.26 |
| 4 | PP 80% | 1900 | 110 | <100 | 5273 | 946 | 0.26 |
| 5 | PE 90% | 1900 | 102 | 25 to 60 | 2170 | 2740 | 0.13 |
| 6 | PE 90% | 1250 | 85 | 25 to 60 | 2626 | 2570 | 0.12 |

Notes to Table
1. Support (% by wt) is the percent by weight of support based on the total weight of the catalyst precursor and the support.
PP = polypropylene support
PE = polyethylene support
2. Finisher (rpm) is the average rpm of the shaft after loading
3. Temperature (°C.) is the average temperature of the finisher after loading
4. Precursor/support (sieve cut on mesh) is a sieved fraction. The value is reported in U.S. mesh size.
5. Catalyst activity is measured in grams of polyethylene product per millimole of titanium per hour per 100 psi of ethylene.
6. Settled bulk density (g/cc) is determined as follows: a resin sample of a fixed volume is collected and weighed. The bulk density is calculated by dividing the weight by the volume, and reported in grams per cubic centimeter.